United States Patent
Kiekens

Patent Number: 5,936,086
Date of Patent: Aug. 10, 1999

[54] CLASSES OF NON-SENSITIZING INFRA-RED DYES FOR USE IN PHOTOSENSITIVE ELEMENTS

[75] Inventor: Eric Kiekens, Zele, Belgium

[73] Assignee: Agfa-Gevaert, N.V., Mortsel, Belgium

[21] Appl. No.: 09/020,690

[22] Filed: Feb. 10, 1998

Related U.S. Application Data

[62] Division of application No. 08/762,442, Dec. 9, 1996, Pat. No. 5,741,632.

[30] Foreign Application Priority Data

Dec. 14, 1995 [EP] European Pat. Off. .............. 95203492

[51] Int. Cl.$^6$ .................................................. C09B 23/08
[52] U.S. Cl. ........................... 544/301; 548/427; 548/455
[58] Field of Search ............................ 544/301; 548/427, 548/455

[56] References Cited

U.S. PATENT DOCUMENTS

| | | | |
|---|---|---|---|
| 2,895,955 | 7/1959 | Heseltine et al. | 430/522 |
| 4,839,265 | 6/1989 | Ohno et al. | 430/522 |
| 4,876,181 | 10/1989 | Proehl et al. | 430/522 |
| 4,940,654 | 7/1990 | Diehl et al. | 430/522 |
| 5,153,112 | 10/1992 | Yoshida et al. | 430/522 |
| 5,330,884 | 7/1994 | Faabricius et al. | 548/455 X |
| 5,397,690 | 3/1995 | Fabricius et al. | 430/522 |
| 5,747,233 | 5/1998 | Lonsky et al. | 430/522 |
| 5,767,287 | 6/1998 | Bobrow et al. | 548/455 |

FOREIGN PATENT DOCUMENTS

| | | |
|---|---|---|
| 779540 | 6/1997 | European Pat. Off. . |
| 07333784 | 12/1995 | Japan . |

OTHER PUBLICATIONS

Harada et al., Chemical Abstracts, 124:274366 (1996). Abstract of JP 07–333,784.

*Primary Examiner*—Fiona T. Powers
*Attorney, Agent, or Firm*—Breiner & Breiner

[57] ABSTRACT

A novel class of non-sensitizing infra-red dyes derived from heptamethine dyes with indolenine nuclei is disclosed. They are useful as filter-, acutance- or antihalation dyes for photographic elements based on silver halide or for photothermographic elements.

1 Claim, No Drawings

CLASSES OF NON-SENSITIZING INFRA-RED DYES FOR USE IN PHOTOSENSITIVE ELEMENTS

This is a division of application Ser. No. 08/762,442 filed Dec. 9, 1996, now U.S. Pat. No. 5,741,632.

FIELD OF THE INVENTION

The present invention relates to a new type of infra-red absorbing compounds and photographic materials containing these compounds.

BACKGROUND OF THE INVENTION

Light-absorbing dyes incorporated in silver halide photographic materials can accomplish a variety of goals, including their use as filter dyes, acutance dyes or antihalation dyes.

When present in a non-photosensitive top layer or intermediate layer they typically serve as filter dyes eliminating an unwanted part of the light spectrum of the exposure source. A well-known example is the yellow filter layer usually present in colour photographic materials in order to prevent blue light from reaching the green sensitive and red sensitive layers. Another example is formed by UV-absorbing compounds, usually present in the top protective layer, which prevent photochemical deterioration of the image dyes formed by colour development. Examples of useful UV-absorbers include the cyanomethyl sulphone-derived merocyanines of U.S. Pat. No. 3,723,154, the thiazolidones, benzotriazoles and thiazolothiazoles of U.S. Pat. Nos. 2,739,888, 3,253,921, 3,250,617 and 2,739,971, the triazoles of U.S. Pat. No. 3,004,896, and the hemioxonols of U.S. Pat. No. 3,125,597.

On the other hand light-absorbing dyes when present in the emulsion layer can serve as so-called "acutance dyes" or "screening dyes" improving the image sharpness by reducing the sidewise scattering of light by the emulsion grains.

In a third application light-absorbing dyes act as "antihalation dyes" improving the image sharpness by diminishing the upward reflection of light by the support into the emulsion layer. For this purpose the dye can be incorporated in an undercoat, being a non-photosensitive layer between the emulsion layer and the support, or it can be incorporated in the base itself, or preferably, it can be present in one or more backing layers of the photographic material.

Apart from conventional photographic materials light-absorbing dyes can be useful for similar purposes in so-called photothermographic materials, such as materials based on the so-called Dry Silver technology originally developed by 3M. It is a catalytic process which couples the light-capturing capability of silver halide to the image-forming capability of organic silver salts, such as silver behenate. Traditionally, silver halide, preferably silver bromide, is formed in situ by reacting silver behenate with bromide ions. The result of this process is the formation of very fine grains of silver bromide, less than 500 Angstroms in diameter and positioned in catalytic proximity to the silver behenate. Exposure to light causes photolytic reduction at the silver bromide crystal (latent image formation) and provides a silver nucleus in position to permit catalysis of the reduction of the organic silver salt to silver metal at an elevated temperature thus producing a visual density. A disadvantage of this technology is that in the non-exposed areas silver halide remains which forms print-out silver on aging thereby increasing the minimal density possibly to an unacceptable level for some purposes. Details on the dry silver technology can be found in U.S. Pat. Nos. 3,457,075, 3,839,049, 4,260,677 and J. Phot. Sci., Vol. 41 (1993), p. 108.

Useful dyes absorbing in the visible spectral region include, for instance, the coloured pigments of U.S. Pat. No. 2,697,037, the pyrazolone oxonol dyes of U.S. Pat. No. 2,274,782, the styryl and butadienyl dyes of U.S. Pat. No. 3,423,207, the diaryl azo dyes of U.S. Pat. No. 2,956,879, the merocyanine dyes of U.S. Pat. No. 2,527,583, the merocyanine and oxonol dyes of U.S. Pat. No. 3,486,897, U.S. Pat. Nos. 3,652,284 and 3,718,472, and the enaminohemioxonol dyes of U.S. Pat. No. 3,976.661. Absorbing dyes can be added as particulate dispersions as disclosed in U.S. Pat. No. 4,092,168, EP 0 274 723 and EP 0 299 435.

In recent years new techniques of image recording have emerged wherein the exposure source of the recording apparatus is a laser unit. For instance, one application of lasers as exposure units is situated in the field of radiographic monitoring photography where a hard copy of radiographic information has to be produced. Other applications are situated in the pre-press field of phototype-setting and image-setting, where recorders are marketed which employ Ar ion lasers, He-Ne lasers or solid state semiconductor lasers, also called laserdiodes, as exposure source. The latter type of laser, the laserdiode, shows some advantages compared to other laser types such as low cost price, small size, long life time and no need for an acoustic-optical modulator. Generally the emission wavelength of these semiconductor laser beams is longer than 700 nm and mostly longer than 750 nm. So photographic materials appropriate for exposure by devices employing such laserdiodes must be sensitized for the near infra-red region of the radiation spectrum. Infra-red sensitized photographic materials are known for quite some time in photographic technology. One of the well-known early applications was and still is in aerial photography. Suitable photographic materials to be used with a semiconductor laser device are disclosed in Japanese Unexamined Patent Publication (Kokai) No 61752/85 and U.S. Pat. No. 4,784,933. Commercial infra-red sensitized film and paper were announced by Eastman Kodak Co in "Proceedings Lasers in Graphics", Electronic Publishing in the '80's, Vol 2 (Sept. 1985) p. 508, and put on the market lateron. Other manufacturers followed including Agfa-Gevaert N. V. and Fuji Photo Film Co. Examples of image-setters using a laserdiode exposure are the PROSET 9800 and the ELAN apparatus marketed by Bayer Co., Agfa division.

An infra-red sensitized photothermographic material for medical imaging purposes and based on Dry Silver technology is marketed by 3M under the trade name Dry View.

An infra-red sensitized element must contain an infra-red spectral sensitizer (see references furtheron) but it also preferably contains one or more non-sensitizing infra-red absorbing dyes for use as filter-, acutance- and/or antihalation dyes.

A suitable non-sensitizing infra-red dye can be chosen from the numerous disclosures and patent applications in the field, e.g., from U.S. Pat. No's 4,886,733, 5,075,205, 5,077,186, 5,153,112, 5,244,771, from Japanese unexamined patent publications (Kokai) No.'s 01-253734, 01-253735, 01-253736, 01-293343, 01-234844, 02-3037, 02-4244, 02-127638, 01-227148, 02-165133, 02-110451, 02-234157, 02-223944, 02-108040, 02-259753, 02-187751, 02-68544, 02-167538, 02-201351, 02-201352, 03-23441, 03-10240, 03-10239, 03-13937, 03-96942, 03-217837, 03-135553, 03-235940, and from the European published patent applications publ. No.'s 0 483 740, 0 502 508, 0 523 465, 0 539 786, 0 539 978, 0 530 511 and 0 568 022, and from International Patent publication WO 95/07822. This list is far from exhaustive and limited to rather recent disclosures. Older disclosures on infra-red absorbing dyes include e.g. EP 0 251 282, in EP 0 288 076, and in U.S. Pat. No. 4,839,265.

A large part of the patents on infra-red dyes cited above include heptamethine cyanines with indolenine nuclei and penta- and heptamethine cyanines with quinoline nuclei that contain sulphonic acid groups or salts thereof as water-solubilizing groups. These compounds are excellent infra-red antihalation dyes but the sulphonic acid substituents make them diffusible under normal coating conditions. On the other hand it is known in the prior art that antihalation dyes (not limited to infra-red dyes) can be rendered resistant to diffusion by providing their molecular structure with a carboxylic acid group as solubilizing group. At neutral pH these dyes are present as non-diffusible solid particle dispersions, while they become soluble and diffusable under the influence of an alkaline developer. For instance, U.S. Pat. No. 5,075,205 discloses infra-red absorbing dyes of the indoaniline type bearing a —COOH group. JP-A 03-13937 describes solid particle dispersions of heptamethin cyanins with —COOH as solubilizing group. According to U.S. Pat. No. 4,940,654 other solubilizing groups can be used provided their $pK_a$ value is situated in the proper range.

The present invention extends the teachings on infra-red absorbing non-sensitizing dyes.

It is the object of the present invention to provide a new class of infra-red absorbing compounds that are suited as antihalation-, acutance-, or filter dyes in infra-red sensitized photographic- or photothermographic materials.

It is a further object of the present invention to provide infra-red absorbing dyes that can be incorporated as solid particle dispersions, resistant to diffusion at normal pH but becoming soluble and diffusable under alkaline developer conditions.

Further objects of the invention will become clear from the description hereinafter.

SUMMARY OF THE INVENTION

The objects of the present invention are realized by providing a photosensitive material comprising at least one photosensitive layer and optionally one or more other non-photosensitive layer(s), characterized in that at least one of said layers contains an infra-red absorbing compound represented by following general formula (I):

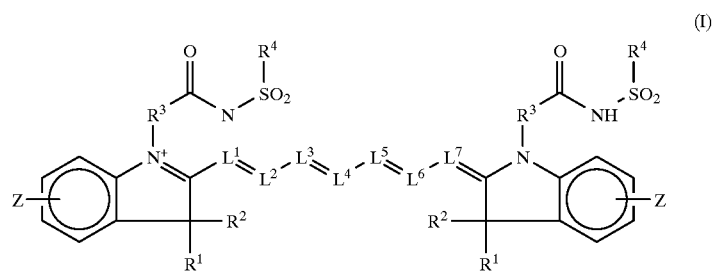

or an external salt thereof (as will be explained in the Detailed Description section), wherein Z represents hydrogen, or the necessary atoms to complete a fused-on aromatic ring, e.g. phenylene, $R^1$ and $R^2$ each independently represent hydrogen or lower ($C_1$–$C_3$) alkyl, $R^3$ represents lower ($C_1$–$C_3$) alkylene, $R^4$ represents an alkyl or aryl group, each of $L^1$–$L^7$ represents a methine group, and the substituents of which may link together to form a supplementary ring.

The compounds according to (I) or (II) may be incorporated in a conventional silver halide photographic material or in a Dry Silver type photothermographic element.

DETAILED DESCRIPTION OF THE INVENTION

The incorporation of the —$R^3$—CO—$N^-$—$SO_2$—$R^4$ groups in the molecular structure renders the infra-red dyes of the present invention novel over the prior art.

A non-exhaustive list of useful dyes in connection with the present invention include following compounds:

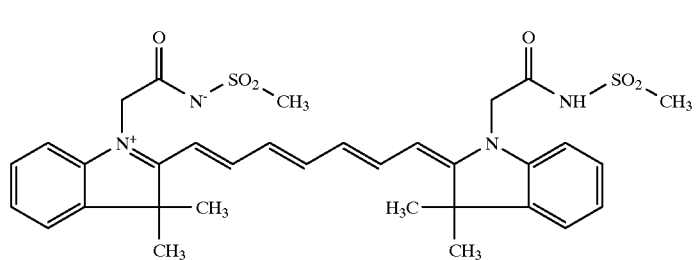
D1
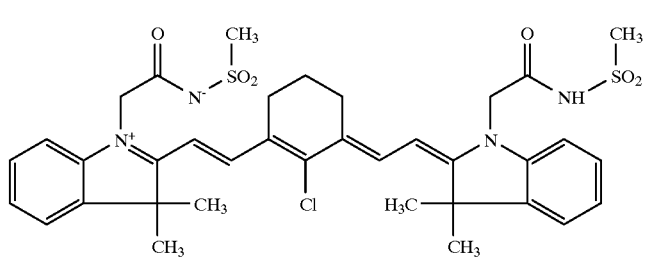
D2
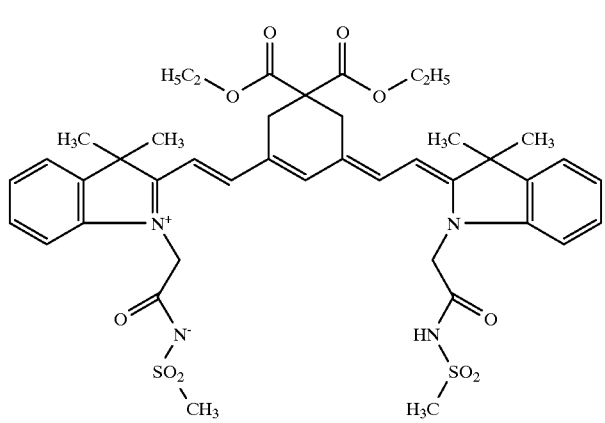
D3
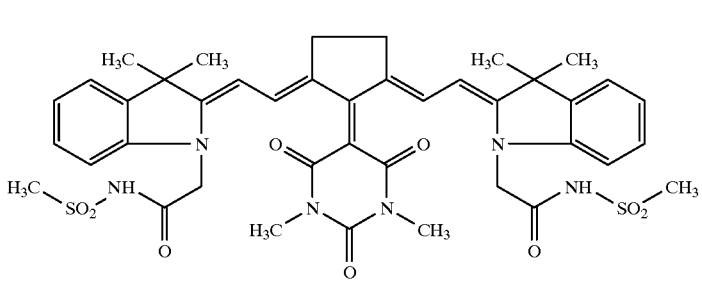
D4
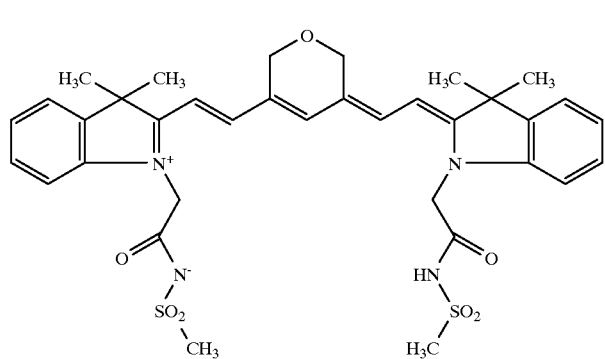
D5

-continued
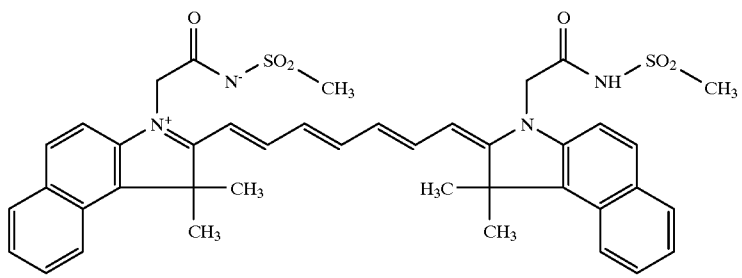
D6
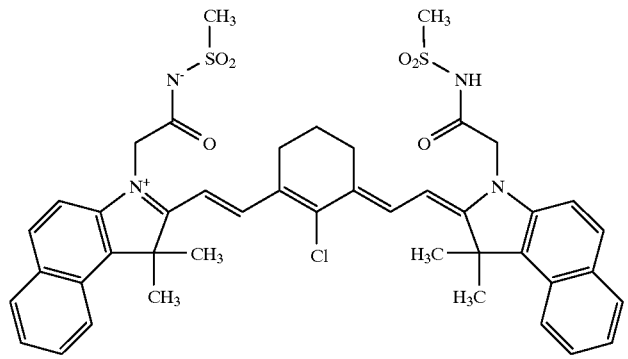
D7
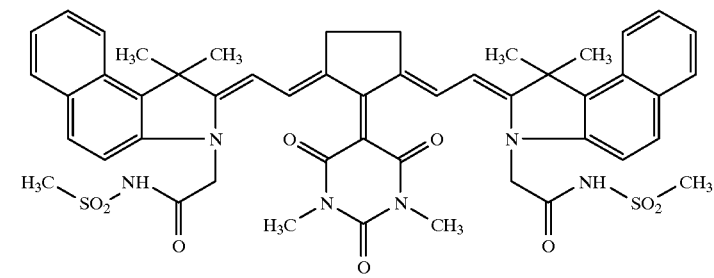
D8
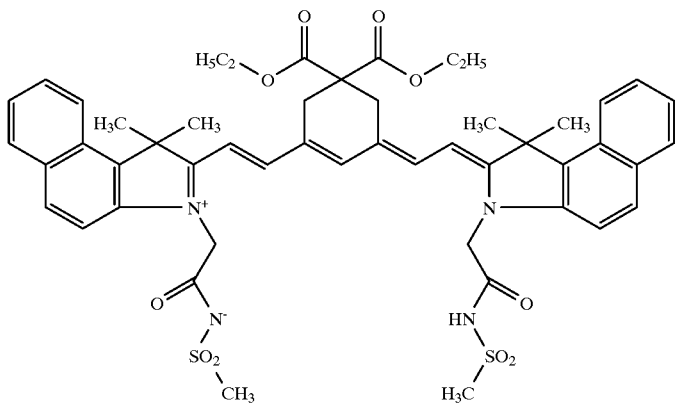
D9

D10

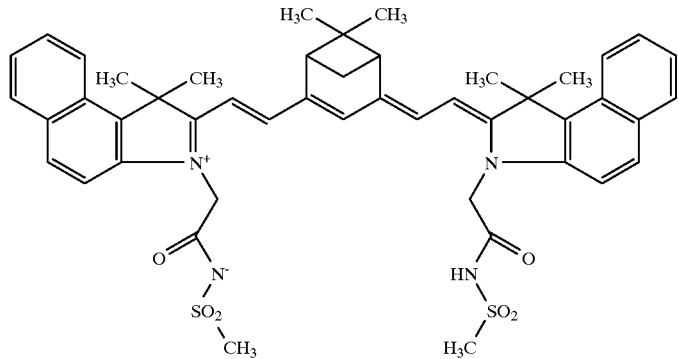

D11

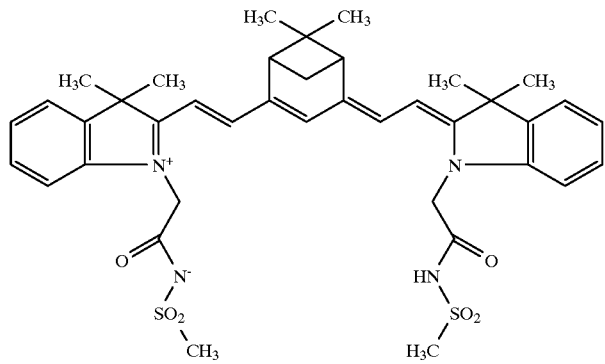

D12

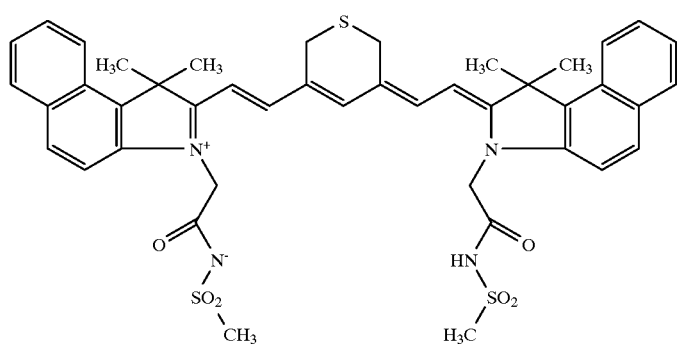

D13

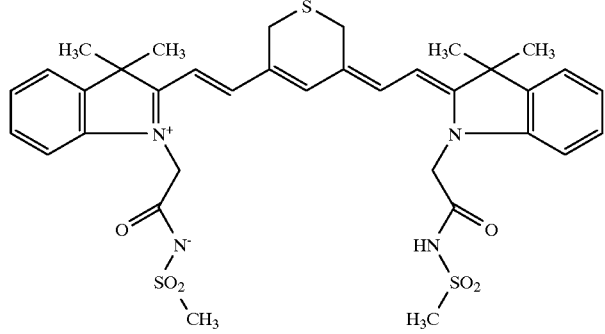

The general formula and the actual examples of the infra-red absorbing compounds are written in their internal salt form. However, the compounds can also be used as external salts and these forms also belong to the scope of the present invention. Two different ways of salt formation are possible. On the one hand, the —N⁻— group of the —CO—N⁻—SO$_2$—R$^4$ moiety of the left nucleus can be replaced by —NH—. X⁻ wherein X⁻ is a negative counterion, e.g. Cl⁻, Br⁻, etc. On the other hand, the —NH— group of the —CO—NH—SO$_2$—R$^4$ moiety can be replaced by —N⁻—. M⁺, wherein M⁺ represents a cation such as Na⁺ or K⁺, or (H.Base)⁺ such as (H.triethylamine)⁺, (H.pyridine)⁺, (H.morpholine)⁺, (H.DBU)⁺ (DBU=1.8- diazabicyclo [5.4.0.]undec-7-ene, and (H.DABCO)⁺, (DABCO=1,4- diazabicyclo [2.2.2.]octane. The latter way of salt formation is preferred since these salts are readily soluble in water or a water/solvent mixture at neutral pH, so that they can easily incorporated in the coating solution. The most preferred salt forms are the triethylamine salt and the DBU salt.

The general synthesis pathway of the infra-red dyes of the present invention can be represented by the following scheme:

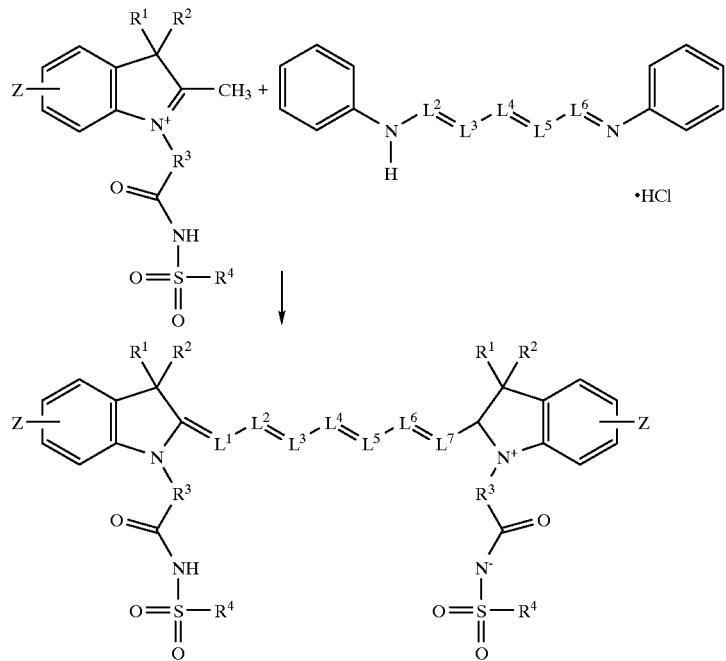

The actual infra-red absorbing compounds are useful for incorporation in an infra-red sensitized photosensitive material. This can be a conventional photographic material based on silver halide chemistry. In this case the silver halide emulsion serves both as sensitive light-capturing species and as density generating species on development. Alternatively the compounds can be incorporated in a Dry Silver type photothermographic element. In this embodiment the silver halide is present only at a small coverage compared to classical photographic elements. The latent image of the silver halide, generated on exposure, merely serves as catalytic center for the chemical reduction of an organic silver salt, e.g. silver behenate, which is the density generating species during a heat development.

For most purposes the photosensitive layer of the photosensitive material consists of a single layer but principally a double or even a multiple emulsion layer can be present.

The halide composition of the silver halide emulsion(s) used according to the present invention is not specifically limited and may be any composition selected from e.g. silver chloride, silver bromide, silver iodide, silver chlorobromide, silver bromoiodide, and silver chlorobromoiodide.

The photosensitive emulsions can be prepared from soluble silver salts and soluble halides according to different methods as described e.g. by P. Glafkidès in "Chimie et Physique Photographique", Paul Montel, Paris (1967), by G. F. Duffin in "Photographic Emulsion Chemistry", The Focal Press, London (1966), and by V. L. Zelikman et al in "Making and Coating Photographic Emulsion", The Focal Press, London (1966). They can be prepared by mixing the halide and silver solutions in partially or fully controlled conditions of temperature, concentrations, sequence of addition, and rates of addition. The silver halide can be precipitated according to the single-jet method, the double-jet method, the conversion method or an alternation of these different methods.

The silver halide particles of the photographic emulsions used according to the present invention may have a regular crystalline form such as a cubic or octahedral form or they may have a transition form. They may also have an irregular crystalline form such as a spherical form or a tabular form, or may otherwise have a composite crystal form comprising a mixture of said regular and irregular crystalline forms.

The silver halide grains may have a multilayered grain structure. According to a simple embodiment the grains may comprise a core and a shell, which may have different halide compositions and/or may have undergone different modifications such as the addition of dopes. Besides having a differently composed core and shell the silver halide grains may also comprise different phases inbetween.

Two or more types of silver halide emulsions that have been prepared differently can be mixed for forming a photographic emulsion for use in accordance with the present invention.

The average size of the silver halide grains for photographic materials may range from 0.05 to 1.0 micron, preferably from 0.2 to 0.5 micron. For a photothermographic element the average size is preferably smaller than $0.1\mu$. The size distribution of the silver halide particles can be homodisperse or heterodisperse.

The silver halide crystals can be doped with $Rh^{3+}$, $Ir^{4+}$, $Ir^{3+}$, $Cd^{2+}$, $Zn^{2+}$ or $Pb^{2+}$.

The emulsion can be desalted in the usual ways e.g. by dialysis, by flocculation and re-dispersing, or by ultrafiltration.

The light-sensitive silver halide emulsions are preferably chemically sensitized as described e.g. in the above-mentioned "Chimie et Physique Photographique" by P. Glafkidès, in the above-mentioned "Photographic Emulsion Chemistry" by G. F. Duffin, in the above-mentioned "Making and Coating Photographic Emulsion" by V. L. Zelikman et al, and in "Die Grundlagen der Photographischen Prozesse mit Silberhalogeniden" edited by H. Frieser and published by Akademische Verlagsgesellschaft (1968). As described in said literature chemical sensitization can be carried out by effecting the ripening in the presence of small amounts of compounds containing sulphur e.g. thiosulphate, thiocyanate, thioureas, sulphites, mercapto compounds, and rhodamines. The emulsions can be sensitized also by means of gold-sulphur ripeners or by means of reductors e.g. tin compounds as described in GB 789,823, amines, hydrazine derivatives, formamidine-sulphinic acids, and silane compounds. Chemical sensitization can also be performed with small amounts of Ir, Rh, Ru, Pb, Cd, Hg, Tl, Pd, Pt, or Au. One of these chemical sensitization methods or a combination thereof can be used.

In the case of a photothermographic element the silver halide may be not chemically sensitized.

For both photosensitive embodiments the presence of a spectral infra-red sensitizer is indispensable. The most familiar classes of infra-red sensitizing substances are long-chain cyanine dyes. Suitable infra-red sensitizing dyes are disclosed in e.g. U.S. Pat. Nos. 2,095,854, 2,095,856, 2,955, 939, 3,482,978, 3,552,974, 3,573,921, 3,582,344, 3,623,881 and 3,695,888.

However, in most cases the obtained infra-red sensitivity is insufficient and one has to recur to so-called supersensitization.

Supersensitization can be achieved by a combination of at least two spectral sensitizers giving rise to a level of sensitization in some spectral region which is greater than that which would result from any concentration of either dye alone or from the mere additive effect of the dyes. Alternatively, supersensitization can be achieved with selected combinations of spectral sensitizing dyes and other addenda such as stabilizers, anti-foggants, development accelerators or inhibitors, coating aids, brighteners and antistatic agents. A general review on supersensitization is given in James, The Theory of the Photographic Process, Fourth Edition, 1977, pp. 259–265. Several possible mechanisms concerning supersensitization are discussed by Gilman, Photographic Science and Engineering, Vol. 18, 1974, pp. 418–430.

A class of effective supersensitizers, described in Research Disclosure Item 28952. published in May 1988, comprises water-soluble heterocyclic mercapto-compounds containing a thiazole, benzothiazole, naphthothiazole, or quinoline ring system, which ring system may be substituted or not, and also comprising at least one electronegative group e.g. halogen, sulfo, sulphonamide, carboxy and phenyl. These compounds are preferably combined with penta- or heptamethine cyanine dyes, or tetramethine or hexamethine merocyanine dyes sensitizing in the near infra-red spectral region.

Stilbene derivatives are known for a long time in the art as effective supersensitizers in combination with infra-red sensitizing dyes. For instance, U.S. Pat. No. 3,695,888, issued Oct. 3, 1972, discloses sulphonated bis(1,3,5-triazine-2-ylamino)-stilbene compounds in combination with some particular type of tricarbocyanine dyes. U.S. Pat. No. 4,603, 104 claims the combination of infra-red sensitized emulsions, bis(1,3,5-triazine-2-ylamino)-stilbene compounds and some particular stabilizers, e.g. arylmercaptotetrazoles. U.S. Pat. No. 4,677,053 discloses infra-red sensitizers containing a quinoline nucleus in combination with bis(1,3,5-triazine-2-ylamino)-stilbenes. Unexamined Japanese Patent Publication 61-134755 describes the combination of benzopyrylocyanine dye and a bis-triazinyl- or bis-pyrimidyl-imino-stilbene. Unexamined Japanese Patent Publications 62-035343 and 01-097947 disclose some hexamethine rhodanine type sensitizers in combination with stilbene derivatives.

The photosensitive composition(s) for use in accordance with the present invention may comprise compounds preventing the formation of fog or stabilizing the photographic characteristics during the production or storage of the photosensitive elements or during the treatment thereof. Many known compounds can be added as fog-inhibiting agent or stabilizer to the silver halide emulsion. Suitable examples are e.g. the heterocyclic nitrogen-containing compounds such as benzothiazolium salts, nitroimidazoles, nitrobenzimidazoles, chlorobenzimidazoles, bromobenzimidazoles, mercaptothiazoles, mercaptobenzothiazoles, mercaptobenzimidazoles, mercaptothiadiazoles, aminotriazoles, benzotriazoles, nitrobenzotriazoles, mercaptotetrazoles, mercaptopyrimidines, mercaptotriazines, benzothiazoline-2-thione, oxazoline-thione, triazaindenes, tetrazaindenes and pentazaindenes, especially those described by Birr in Z. Wiss. Phot. 47 (1952), pages 2–58, triazolopyrimidines such as those described in GB 1,203,757, GB 1,209,146, JA-Appl. 75-39537, and GB 1,500,278, and 7-hydroxy-s-triazolo-[1,5-a]-pyrimidines as described in U.S. Pat. No. 4,727,017, and other compounds such as benzenethiosulphonic acid, benzenethiosulphinic acid and benzenethiosulphonic acid amide. Other compounds that can be used as fog-inhibiting compounds are metal salts such as e.g. mercury or cadmium salts and the compounds described in Research Disclosure No 17643 (1978), Chapter VI.

The fog-inhibiting agents or stabilizers can be added to the silver halide emulsion prior to, during, or after the ripening thereof and mixtures of two or more of these compounds can be used.

In the case of a photothermographic material more specific classes of stabilizers are preferred such as the ones disclosed in e.g. U.S. Pat. No. 4,036,650, U.S. Pat. No. 4,411,985, U.S. Pat. No. 4,546,075, EP 0 107 093, EP 0 223 606, U.S. Pat. No. 5,041,368, EP 0 600 587, EP 0 605 981, etc. Several classes of these specific stabilizers contain halogen atoms in their molecular structure.

Besides the silver halide another essential component of a light-sensitive layer is the binder. In the case of a conventional photographic element the binder is a hydrophilic colloid, preferably gelatin. Gelatin can, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents or by grafting of polymerizable monomers on gelatin, and cellulose derivatives such as hydroxyalkyl cellulose, carboxymethyl cellulose, phthaloyl cellulose, and cellulose sulphates.

The binders of the photographic element, especially when the binder used is gelatin, can be hardened with appropriate hardening agents such as those of the epoxide type, those of the ethylenimine type, those of the vinylsulfone type e.g. 1,3-vinylsulphonyl-2-propanol, chromium salts e.g. chromium acetate and chromium alum, aldehydes e.g. formaldehyde, glyoxal, and glutaraldehyde, N-methylol compounds e.g. dimethylolurea and methyloldimethylhydantoin, dioxan derivatives e.g. 2,3-dihydroxy-dioxan, active vinyl compounds e.g. 1,3,5-triacryloyl-hexahydro-s-triazine, active halogen compounds e.g. 2,4-dichloro-6-hydroxy-s-triazine, and mucohalogenic acids e.g. mucochloric acid and mucophenoxychloric acid. These hardeners can be used alone or in combination. The binders can also be hardened with fast-reacting hardeners such as carbamoylpyridinium salts as disclosed in U.S. Pat. No. 4,063,952.

In the case of a photothermographic element a hydrophilic binder is usually not present and the photosensitive coating composition is coated from an organic solvent. In this case the binder may be a film forming polymer such as cellulose-acetate-butyrate or polyvinylalcohol. Preferably a polyvinylacetal such as BUTVAR B76 and B79, Monsanto Co., is used.

The photosensitive element of the present invention may further comprise various kinds of surface-active agents in the photographic emulsion layer or in at least one other hydrophilic colloid layer. Suitable surface-active agents include non-ionic agents such as saponins, alkylene oxides e.g. polyethylene glycol, polyethylene glycol/polypropylene glycol condensation products, polyethylene glycol alkyl ethers or polyethylene glycol alkylaryl ethers, polyethylene glycol esters, polyethylene glycol sorbitan esters, polyalkylene glycol alkylamines or alkylamides, silicone-polyethylene oxide adducts, glycidol derivatives, fatty acid esters of polyhydric alcohols and alkyl esters of saccharides; anionic agents comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as alkylamine salts, aliphatic, aromatic, or heterocyclic quaternary ammonium salts, aliphatic or heterocyclic ring-containing phosphonium or sulphonium salts. Such surface-active agents can be used for various purposes e.g. as coating aids, as compounds preventing electric charges, as compounds improving slidability, as compounds facilitating dispersive emulsification, as compounds preventing or reducing adhesion, and as compounds improving the photographic characteristics e.g. higher contrast, sensitization, and development acceleration. Preferred surface-active coating agents are compounds containing perfluorinated alkyl groups.

The photosensitive elements in connection with the present invention may further comprise various other additives such as e.g. compounds improving the dimensional stability of the photographic element, UV-absorbers, spacing agents and plasticizers.

The support of the photosensitive materials in connection with the present invention can be transparent base, preferably an organic resin support, e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.07 and 0.35 mm. These organic resin supports are preferably coated with a subbing layer. On the other hand the support of the photographic material can be a paper base preferably a polyethylene or polypropylene coated paper base.

The photosensitive materials according to the invention can be processed by any means or any chemicals known in the art depending on their particular application. In the case of conventional silver halide infra-red sensitive elements in the field of graphic arts for phototype- or image-setting they are preferably processed in so-called "Rapid Access" chemicals, comprising a conventional Phenidone/hydroquinone developing solution, or an ascorbic acid or derivative containing developing solution, and a conventional sodium- or ammonium thiosulphate containing fixing solution. The development time is usually between 10 and 30 seconds at a temperature of about 35° C. Alternatively they can be processed in so-called "hard dot Rapid Access" chemistry, e.g. the AGFASTAR system marketed by Agfa-Gevaert N.V. Preferably an automatically operated processor provided with automatic regeneration is used, e.g. a RAPILINE device marketed by Agfa-Gevaert N.V.

In the case of a Dry Silver type photothermographic element the development comprises a heat treatment without use of wet chemicals.

The following ingredients were used in the preparation of the photothermographic recording materials of examples 2 to 5 and comparative example 1:

i) in the silver behenate/silver halide emulsion layer:

| | |
|---|---|
| GEL: | phthaloylgelatin, type 16875 from ROUSSELOT; |
| Butvar™ B76: | polyvinylbutyral from MONSANTO; |
| LOWINOX: | 2-propyl-bis(2-hydroxy-3,5-dimethylphenyl)methane from CHEM. WERKE LOWI; |
| PHP: | pyridinium hydrobromide perbromide; |
| CBBA: | 2-(4-chlorobenzoyl)benzoic acid; |
| TMPS: | tribromomethyl benzenesulfinate; |
| MBI: | 2-mercaptobenzimidazole; |
| SENSI: | |

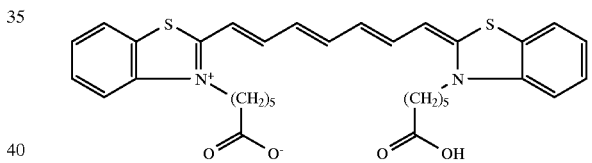

ii) in the protective layer:
CAB: cellulose acetate butyrate, CAB-171-15S from EASTMAN;
PMMA: polymethylmethacrylate, Acryloid™ K120N from ROHM & HAAS.

The following examples and comparative example illustrate the present invention without however limiting it thereto.

EXAMPLES

Example 1

Backing layers were coated belonging to a photothermographic material designed to have an infra-red sensitization maximum around 830 nm. These layers, coated on a 170μ thick clear polyethylene terephthalate support, had a coverage of 2.7 g/m² on polymeric binder, being cellulose-acetate-butyrate (CAB) or polyvinylalcohol (PVA) and a coverage of 25 mg/m² on infra-red dye. The dyes were incorporated as their triethylamine salts or DBU salts.

Table 1a and 1b illustrate the Imax values of some dyes according to the present invention, their optical densities at 830 nm, and their side absorption in the visual region before and after processing in the visual area in different binders. It is important that a dye has a low side absorption in the visual spectral region and that this side absorption does not increase during the heating step of the processing.

TABLE 1a coating in CAB

| Dye | $\lambda_{max}$ | OD (830 nm) before proc. | OD (vis) before proc. | OD (vis) after proc. |
|---|---|---|---|---|
| D1  | 762 | 0.025 | 0.033 | 0.044 |
| D2  | 795 | 0.138 | 0.024 | 0.028 |
| D3  | 760 | 0.059 | 0.029 | 0.035 |
| D4  | 789 | 0.106 | 0.020 | 0.027 |
| D5  | 763 | 0.073 | 0.031 | 0.033 |
| D6  | 791 | 0.152 | 0.031 | 0.031 |
| D7  | 832 | 0.278 | 0.013 | 0.010 |
| D8  | 822 | 0.206 | 0.022 | 0.023 |
| D9  | 793 | 0.171 | 0.027 | 0.032 |
| D10 | 819 | 0.303 | 0.016 | 0.013 |

TABLE 1B coating in PVA

| D1  | 762 | 0.024 | 0.020 | 0.011 |
|---|---|---|---|---|
| D2  | 798 | 0.112 | 0.003 | 0.004 |
| D3  | 765 | 0.006 | 0.009 | 0.012 |
| D4  | 798 | 0.157 | 0.004 | 0.008 |
| D5  | 767 | 0.038 | 0.017 | 0.016 |
| D6  | 800 | 0.209 | 0.010 | 0.003 |
| D7  | 832 | 0.410 | 0.001 | 0.000 |
| D8  | 832 | 0.384 | 0.010 | 0.011 |
| D9  | 801 | 0.161 | 0.000 | 0.004 |
| D10 | 823 | 0.358 | 0.007 | 0.006 |

From the results of tables 1a and 1b it is clear that D7 and D8 are by far the most suitable dyes for the spectral region around 830 nm. The densities in PVA are in general somewhat higher than in CAB.

Examples 2 to 5 and Comparative Example 1

Support

A polyethyleneterephthalate (PET) foil was first coated on both sides with a subbing layer consisting of a terpolymer latex of vinylidene chloride-methyl acrylate-itaconic acid (88/10/2) in admixture with colloidal silica (surface area 100 m²/g). After stretching the foil in the transverse direction the foil had a thickness of 175 μm with coverages of the terpolymer and of the silica in the subbing layers of 170 mg/m² and 40 mg/m² respectively on each side of the PET-foil.

Antihalation Backing Layer

The antihalation backing layers of the photothermographic recording materials of examples 2 to 5 were prepared by coating one side of the subbed PET support with 2.7 g/m² of polyvinylalcohol (PVA) and the quantities of the DBU (1,8-diazabicyclo[5.4.0]undec-7-ene) salt of dye D08 given in table 2 for examples 2 to 5 and comparative example 1 together with the optical densities at 830 nm of the resulting materials:

TABLE 2

| Antihalation backing layer for: | Coverage of dye D08 in mg/m² | Optical density OD (830 nm) before proc. |
|---|---|---|
| Example 2 | 7 | 0.12 |
| Example 3 | 13 | 0.22 |
| Example 4 | 17 | 0.24 |
| Example 5 | 25 | 0.40 |
| Comparative example 1 | 0 | geen |

Silver Halide Emulsion

A silver halide emulsion consisting of 3.11% by weight of silver halide particles consisting of 97 mol % silver bromide and 3 mol % silver iodide with an weight average particle size of 50 nm, 0.47% by weight of GEL as dispersing agent in deionized water was prepared using conventional silver halide preparation techniques such as described, for example, in T. H. James, "The Theory of the Photographic Process", Fourth Edition, Macmillan Publishing Co. Inc., New York (1977), Chapter 3, pages 88–104.

Silver Behenate/Silver Halide Emulsion

The silver behenate/silver halide emulsion was prepared by adding a solution of 6.8 kg of behenic acid in 67 L of 2-propanol at 65° C. to a 400 L vessel heated to maintain the temperature of the contents at 65° C. converting 96% of the behenic acid to sodium behenate by adding with stirring 76.8 L of 0.25M sodium hydroxide in deionized water, then adding with stirring 10.5 kg of the above-described silver halide emulsion at 40° C. and finally adding with stirring 48 L of a 0.4M solution of silver nitrate in deionized water. Upon completion of the addition of silver nitrate the contents of the vessel were allowed to cool and the precipitate filtered off, washed, slurried with water, filtered again and finally dried at 40° C. for 72 hours.

8.97 g of the dried powder containing 9 mol % silver halide and 2.4 mol % behenic acid with respect to silver behenate were then dispersed in a solution of 9.15 g of Butvar™ B76 in 38.39 g of 2-butanone using conventional dispersion techniques yielding a 32% by weight dispersion. A solution of 3.31 g of Butvar™ B76 in 28.33 g of 2-butanone was then added yielding a 24.3% by weight dispersion.

Coating and Drying of Silver Behenate/Silver Halide Emulsion Layer

An emulsion layer coating composition for the photothermographic recording materials of examples 2 to 5 and comparative example 1 was prepared by adding the following solutions or liquids to 64.17 g of the above-mentioned silver behenate/silver halide emulsion in the following sequence with stirring: 0.56 g of a 11.5% solution of PHP in methanol followed by a 2 hours stirring, 0.14 g of a 11% solution of calcium bromide in methanol followed by 30 minutes stirring, 0.42 g of CBBA, 0.92 g of a 0.2% solution of SENSI in 99:1 methanol:triethylamine and 0.03 g of MBI followed by 15 minutes stirring, 1.67 g of LOWINOX, 0.35 g of TMPS and finally 5.7 g of 2-butanone followed by 15 minutes stirring.

The PET-foil subbed and coated with the antihalation layers as described above was then doctor blade-coated at a blade setting of 100 μm on the side of the foil not coated with an antihalation layer with the coating composition to a wet layer thickness of 72 μm, which after drying for 5 minutes at 80° C. on an aluminum plate in a drying cupboard produced a layer with the following composition:

| Butvar ™ B76 | 8.67 g/m² |
|---|---|
| GEL | 0.03 g/m² |
| AgBr$_{0.97}$I$_{0.03}$ | 0.21 g/m² |
| behenic acid | 0.10 g/m² |
| silver behenate | 5.51 g/m² |
| PHP | 0.064 g/m² |
| calcium bromide | 0.015 /m² |
| LOWINOX | 1.67 /m² |
| CBBA | 0.42 g/m² |
| SENSI | 0.00185 g/m² |
| MBI | 0.03 g/m² |
| TMPS | 0.35 g/m² |

Protective Layer

A protective layer coating compositions for the photothermographic recording materials of examples 2 to 5 and comparative example 1 were prepared by dissolving 4.08 g of CAB and 0.16 g of PMMA in 56.06 g of 2-butanone and 5.2 g of methanol adding the following solids with stirring in the following sequence: 0.5 g of phthalazine, 0.2 g of 4-methylphthalic acid, 0.1 g of tetrachlorophthalic acid, 0.2 g of tetrachlorophthalic acid anhydride.

The emulsion layer was then doctor blade-coated at a blade setting of 70 μm with the protective layer coating composition to a wet layer thickness of 48 μm, which after drying for 8 minutes at 80° C. on an aluminum plate in a drying cupboard produced a layer with the following composition:

| CAB | 2.83 g/m² |
|---|---|
| PMMA | 0.11 g/m² |
| Phthalazine | 0.35 g/m² |
| 4-methylphthalic acid | 0.14 g/m² |
| tetrachlorophthalic acid | 0.07 g/m² |
| tetrachlorophthalic acid anhydride | 0.14 g/m² |

Image-Wise Exposure and Thermal Processing

The photothermographic recording materials of examples 2 to 5 and comparative example 1 were exposed to a 849 nm single mode diode laser beam from SPECTRA DIODE LABS with a nominal power of 100 mW of which 50 mW actually reaches the recording material focussed to give a spot diameter (1/e²) of 28 μm, scanned at speed of 50 m/s with a pitch of 14 μm through a wedge filter with optical density varying between 0 and 3.0 in optical density steps of 0.15.

Thermal processing was carried out for 12 s on a drum heated to a temperature of 121° C. and the $D_{max}$- and $D_{min}$-values of the resulting wedge images were evaluated with a MACBETH™ TD904 densitometer with an ortho filter to produce a sensitometric curve for the photothermographic material and the image sharpness was assessed qualitatively using the following numerical codes:

0=unacceptable image sharpness
1=poor image sharpness
2=acceptable image sharpness
3=good image sharpness The results of the image characteristic evaluation for the photothermographic recording materials of examples 2 to 5 and comparative example 1 are summarized in table 3.

TABLE 3

| | Coating weight of D08 [mg/m²] | $D_{max}$ | $D_{min}$ | Image sharpness |
|---|---|---|---|---|
| Example number | | | | |
| 2 | 7 | 2.56 | 0.10 | 1 |
| 3 | 13 | 2.50 | 0.10 | 2 |
| 4 | 17 | 2.52 | 0.12 | 2 |
| 5 | 25 | 2.50 | 0.12 | 3 |
| Comparative example number | | | | |
| 1 | 0 | 2.74 | 0.10 | 0 |

From these results it is clear that the incorporation of 25 mg/m² of D08 in the antihalation backing layer enables an image with a good image sharpness to be obtained, whereas the non-use thereof produces an image with unacceptable image sharpness.

Example 6

Gelatinous backing layers were coated belonging to a conventional silver halide photographic element designed to have a sensitization maximum around 780 nm. A first backing layer contained 25 mg/m² of dye, 2 g/m² of gelatin and a small amount of colloidal silica. The dyes were incorporated as their DBU salts. A second backing layer contained gelatin, and conventional wetting agents, matting agent and hardener.

Table 4 gives the values of $\lambda_{max}$ and the optical density (OD) at 780 nm of the untreated fresh coating, the OD at 780 nm after a heat treatment of 3 days at 57° C./34 RH, serving as a stability test for the dye, and the OD at 780 nm after a rinse treatment of 10 seconds in a conventional alkaline hydroquinone/Phenidone developer for determination of residual stain.

TABLE 4

| Dye No. | λmax fresh | OD(830) fresh | OD(830) 3 d 57/34 | OD(830) 10 s dev. |
|---|---|---|---|---|
| D1 | 764 | 0.620 | 0.600 | 0 |
| D2 | 802 | 0.430 | 0.410 | 0.135 |
| D6 | 768 | 0.330 | 0.335 | 0 |
| D7 | 805 | 0.405 | 0.335 | 0 |
| D8 | 770 | 0.505 | 0.490 | 0 |
| D9 | 802 | 0.390 | 0.365 | 0.19 |
| D11 | 842 | 0.190 | 0.175 | 0.115 |
| D12 | 804 | 0.310 | 0.290 | 0.21 |
| D13 | 890 | 0.220 | 0.200 | 0.19 |
| D14 | 790 | 0.560 | 0.520 | 0.095 |
| D15 | 794 | 0.330 | 0.300 | 0.23 |
| D16 | 758 | 0.110 | 0.120 | 0 |

From table 4 it is clear that the most interesting antihalation dyes for incorporation in a photographic material designed for recording at 780 nm are D1, D8 and D14 in view of their spectral distribution, density at 780 nm, stability and residual stain.

Example 7: Preparative Examples 7.1. Preparation of Intermediate Compound A (ICa)

3.04 kg of chloroacetylchloride and 2.425 kg of methylsulphonamide were warmed up slowly in 10.2 l of butyl acetate until reflux for 8 h. After cooling of the reaction mixture to room temperature the residue obtained was filtered off. The residue was washed with 4 l of butyl acetate. 3.24 kg of intermediate compound a (ICa) was obtained. The yield was 74%.

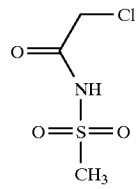

ICa

7.2. Preparation of Intermediate Compound B (ICb)

796 g of 2,3,3-trimethylindolenine and 1716 g of ICa were stirred for 6 h in 1 l of sulfolane at 110° C. After cooling to 50° C. 6 l of acetone was added and the mixture was stirred for 12 h at room temperature. The residue obtained was filtered off, washed with acetone and dried. 900 g of ICb was obtained. The yield was 54%.

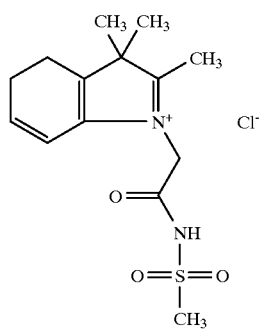

ICb

7.3. Preparation of Infra-Red Dye D1

7.12 g of starting compound I (SC I; see below; synthesis known), 4.7 ml of acetic acid anhydride, and 13.9 ml of triethylamine were stirred in 100 ml of acetonitrile for 15 min. Then 16.54 g of ICb were added and the mixture was stirred for 1 h at 50° C. After cooling to room temperature 100 ml of distilled water and 10 ml of of acetic acid were added. The residue formed was filtered off and washed with 50 ml of acetone. 13.2 g of infra-red dye D1 were obtained. The yield 81%.

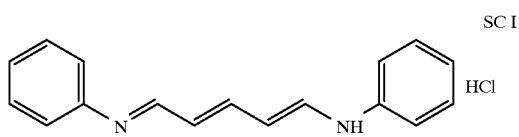

SC I

7.4. Preparation of Infra-Red Dye D2

7.54 g of starting compound II (SC II; see below; synthesis known), 3.95 ml of acetic acid anhydride, and 12.6 ml of DBU were stirred in 40 ml of acetonitrile for 15 min. Then 13.89 g of ICb were added and this mixture was stirred for 3 h at room temperature. 50 ml of methanol were added and the residue obtained was filtrated. The residue was washed with 50 ml of acetone. 12.4 g of the DBU salt of infra-red dye D2 were obtained. The yield was 81%.

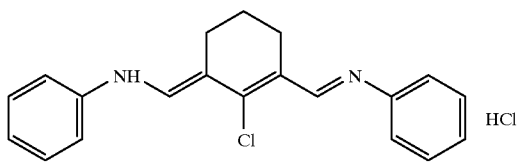

SC II

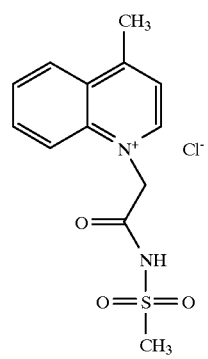

SC IV

7.5 Synthesis of Intermediate Compound C (ICc)

0.057 g of p. -toluenesulphonic acid monohydrate and 50 g of Myrtenal were stirred in 50 ml of ethanol for 15 min. Then 102 ml of ortho-formic acid-ethylester were added while the temperature was kept under 50° C. The reaction mixture was stirred under reflux for 3 h. After cooling to room temperature 0.111 ml of a 30% solution of sodium methanolate were added and the mixture was stirred for 15 min. The fraction distilling at 100° C. at a pressure of 30 mm Hg was collected. This fraction was the diethylacetal of Myrtenal. 23.2 ml of DMF were chilled to 0° C. Then 19.6 ml of POCl$_3$ were added and the mixture was stirred for 1 h at room temperature. Whilst slightly cooling a solution in 50 ml DMF of 24.4 g of the diethylacetal of Myrtenal, obtained as explained above, was added. The reaction mixture was stirred for 30 min. Then 100 ml of methanol and 75 ml of aniline were added subsequently and the mixture was stirred each time for 30 min. Then the mixture was poured into a 1N HCl solution and stirred again for 30 min. The precipitate formed was filtrated on a Buchner filter and washed with water until a neutral pH was obtained. Then the precipitate was dissolved in 110 ml of methanol and 880 ml of ethyl acetate were added. The precipitate was filtered off and washed with ethyl acetate. 25 g of ICc was obtained. The yield was 70%.

ICc

7.6. Preparation of Infra-Red Dye D10

3.65 g of intermediate compound ICc, prepared as described, 1.88 ml of acetic acid anhydride, and 6 ml of DBU were stirred in 30 ml of acetonitrile for 15 min. Then 7.62 g of starting compound V (SC V; see below; synthesis analogous to ICb) were added and the mixture was stirred for 24 h at room temperature. Then 50 ml of acetone, 30 ml of acetic acid and 30 ml of distilled water were added. The precipitate was filtered off and washed with 50 ml of methanol. 4 g of infra-red dye D10 were obtained. The yield was 48%.

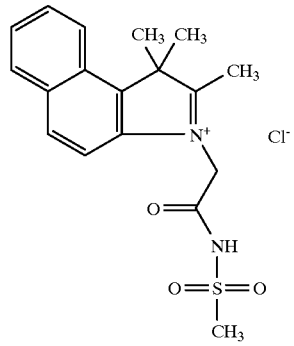

SC V

I claim:

1. An infra-red absorbing compound represented by following general formula (I):

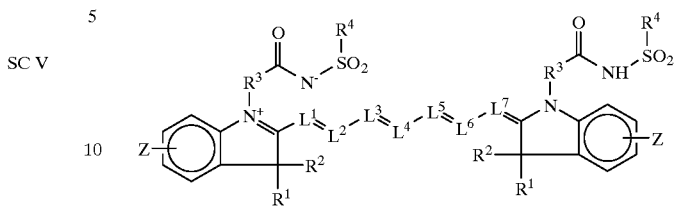

or an external salt thereof, wherein Z represents hydrogen, or the necessary atoms to complete a fused-on aromatic ring, $R^1$ and $R^2$ each independently represent hydrogen or lower ($C_1$–$C_3$), $R^3$ represents lower alkylene $R^4$ represents an alkyl or aryl group, each of $L^1$–$L^7$ represents a methine group and the substituents of which may link together to form a supplementary ring.

* * * * *

UNITED STATES PATENT AND TRADEMARK OFFICE
CERTIFICATE OF CORRECTION

PATENT NO. : 5,936,086
DATED : August 10, 1999
INVENTOR(S) : Eric Kiekens

It is certified that error appears in the above-indentified patent and that said Letters Patent is hereby corrected as shown below:

Column 11, line 50, "salt." should read -- salt, --.

Column 17, line 1, "Imax" should read -- $\lambda$max --.

Column 24, Claim 1, line 17, delete "$(C_1-C_3)$" and insert -- alkyl --.

Signed and Sealed this

Sixth Day of June, 2000

Q. TODD DICKINSON

Attest:

*Attesting Officer*  *Director of Patents and Trademarks*